United States Patent
Li et al.

(10) Patent No.: US 9,910,133 B2
(45) Date of Patent: Mar. 6, 2018

(54) SYSTEMS AND METHODS FOR CASCADING RADAR CHIPS HAVING A LOW LEAKAGE BUFFER

(71) Applicant: Infineon Technologies AG, Neubiberg (DE)

(72) Inventors: Hao Li, Poing (DE); Herbert Knapp, Munich (DE)

(73) Assignee: Infineon Technologies AG, Neubiberg (DE)

( * ) Notice: Subject to any disclaimer, the term of this patent is extended or adjusted under 35 U.S.C. 154(b) by 341 days.

(21) Appl. No.: 14/630,754

(22) Filed: Feb. 25, 2015

(65) Prior Publication Data
US 2016/0245898 A1    Aug. 25, 2016

(51) Int. Cl.
*G01S 7/03* (2006.01)
*G01S 13/93* (2006.01)

(52) U.S. Cl.
CPC ............ *G01S 7/032* (2013.01); *G01S 13/931* (2013.01)

(58) Field of Classification Search
CPC ............................... G01S 13/931; G01S 7/032
USPC ....................................................... 342/70–72
See application file for complete search history.

(56) References Cited

U.S. PATENT DOCUMENTS

| | | |
|---|---|---|
| 5,294,936 A | 3/1994 | Hall |
| 6,081,225 A | 6/2000 | Tsai et al. |
| 2002/0021231 A1* | 2/2002 | Schlager ............... B63C 9/0005 340/984 |

* cited by examiner

*Primary Examiner* — Timothy A Brainard
(74) *Attorney, Agent, or Firm* — Eschweiler & Potashnik, LLC

(57) ABSTRACT

A cascaded radar sensor arrangement is disclosed. The arrangement includes a first buffer and a second buffer. The first buffer is within a first radar chip and includes a switch and is configured to mitigate a first leakage signal in the disabled mode. The second buffer is within a second radar chip and has a disabled mode. The second radar chip is cascaded with the first radar chip. A control unit is coupled to the first radar chip and the second radar chip and is configured to set the disabled mode for the first buffer.

16 Claims, 12 Drawing Sheets

709

SYSTEMS AND METHODS FOR CASCADING RADAR CHIPS HAVING A LOW LEAKAGE BUFFER

BACKGROUND

One type of component commonly used in vehicle systems for active safety is a radar chip. This component can be used to measure the speed and distance of preceding cars and also detect objects around a vehicle.

The radar chip operates by transmitting electromagnetic waves and then receiving the magnetic waves after they bounce off of targets. Having more signals transmitted and received can improve the accuracy and performance.

One technique to improve the accuracy and functionality of the radar chip is to increase the number of channels, including transmission and receiver channels. However, increasing the number of channels in a radar chip can lead to a costly design, for example such as requiring a relatively large chip, relatively larger package size, more RF I/O ports and relatively large power consumption.

What is needed is a technique to improve radar performance by using more channels/signals for transmission and reception while mitigating complexity and power consumption.

DETAILED DESCRIPTION

Figure 1:
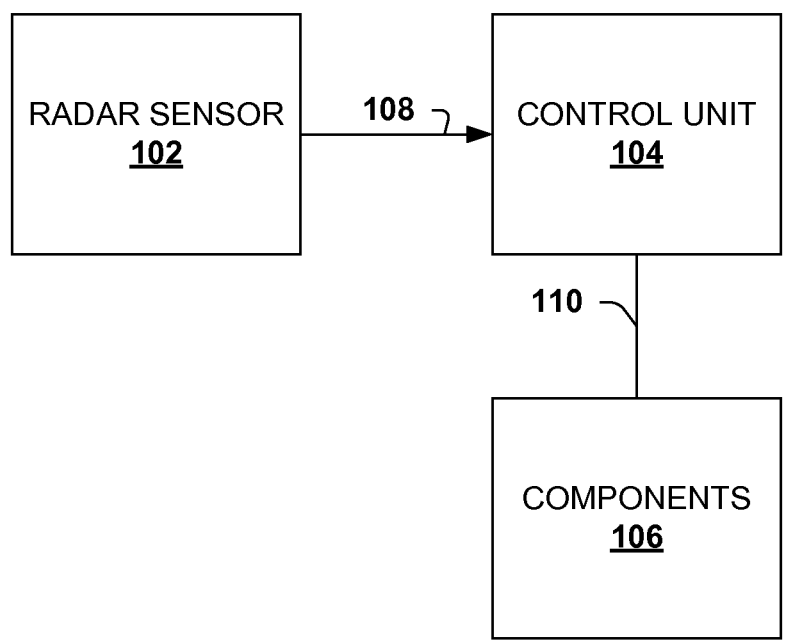
FIG. 1 is a diagram illustrating a cascading radar system that utilizes low leakage buffers.

The systems and methods of this disclosure are described with reference to the attached drawing figures, wherein like reference numerals are used to refer to like elements throughout, and wherein the illustrated structures and devices are not necessarily drawn to scale.

FIG. 1 is a diagram illustrating a cascading radar system 100 that utilizes low leakage buffers. The system 100 can be used in vehicle systems to detect objects, track objects, and the like. The system 100 is configured to operate using selected frequencies, including, for example, frequencies above 20 GHz, and other suitable frequencies or ranges.

The system 100 includes a cascaded radar sensor 102, a control unit 104 and one or more components 106. The radar sensor 102 includes a plurality of radar chips cascaded together and sharing a single local oscillator signal. The sensor 102 provides a relatively large number of RF channels, including transmission (TX) channels and receiver (RX) channels in order to enhance performance and accuracy.

Additionally, the radar sensor 102 includes low leakage buffers that facilitate cascading multiple radar chips together. Without the low leakage buffers, leakage signals are generated that degrade and/or prevent proper operation of the system 100.

The control unit 104 is configured to control operation of the radar sensor 102 and to receive radar information 108 from the radar sensor 102. The control unit 104 is also configured to provide derived information 110 based on the received radar information. The control unit 104 can utilize a bus and/or other communication component for the information 108 and/or the derived information 110.

The control unit 104 generates the derived information including, for example, detected objects, identification of detected objects, location of detected objects, speed of detected objects, and the like. The control unit can be implemented using a process and a memory, where the processor executes instructions from the memory to perform.

The one or more components 106 receive and utilize the derived information 110. The components 106 can include, for example, antilock braking systems, air bag deployment systems and the like that utilize the radar based derived information 110.

Figure 2:
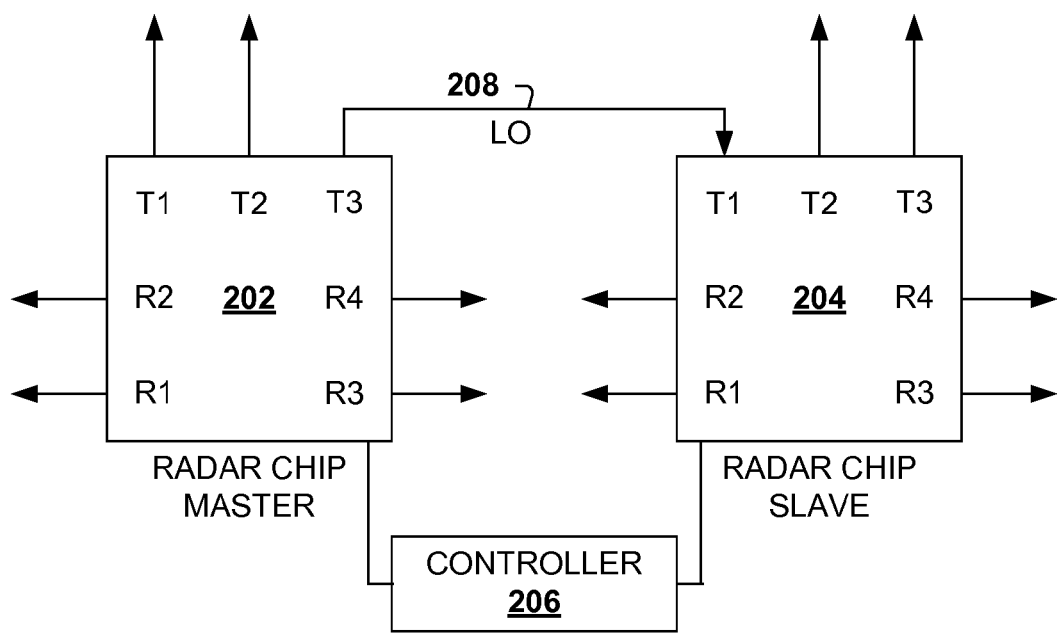
FIG. 2 is a block diagram illustrating a cascaded radar sensor.

FIG. 2 is a block diagram illustrating a cascaded radar sensor 200. The sensor 200 can be used as the sensor 102 in the system 100 described above. Additionally, the sensor 200 can be used in other systems and arrangements.

The sensor 200 in this example uses two radar chips, however it is appreciated that using more than two radar chips is contemplated. The sensor 200 includes a first radar chip 202, a second radar chip 204 and a controller 206. The first radar chip 202 has 3 channels for transmission (TX) and 4 channels for receiving (RX). Similarly, the second radar chip 204 has 3 channels for TX and 4 channels for RX. It is appreciated that the radar chips 202 and 204 are contemplated with other numbers of TX channels and RX channels.

The first radar chip 202 operates in a master mode and is also referred to as the master radar chip. The first radar chip 202 includes an oscillator signal generating device and it is enabled during the master mode. The signal generating device can include a voltage controlled oscillator (VCO) and/or a phase locked loop (PLL). The oscillator signal generating device generates a local oscillator (LO) signal 208.

The first radar chip 202 includes four RX channels; R1, R2, R3 and R4 and three TX channels; T1, T2 and T3. The LO signal 208 is directly connected from T3 to one LO input port (T1) of the second radar chip 204. The channel T3, in this mode, is not used for transmission of radar signals, but is instead used for providing the LO signal 208 for use by other radar chips.

The second radar chip 204 operates in a slave mode and is also referred to as the slave radar chip. The second radar chip 204 also includes four RX channels; R1, R2, R3 and R4 and three TX channels; T1, T2 and T3. Additionally, the second radar chip 204 can include an oscillator signal generating device, such as a VCO and/or PLL. However, the oscillator signal generating device in the second radar chip 204 is disabled. Instead of its own local oscillator signal, the second radar chip 204 uses the LO signal 208 from the first radar chip 202.

Although not shown, it is appreciated that other radar chips operating in slave mode and utilizing the LO signal 208 can also be present.

The sensor controller 206 is configured to set the mode (slave/master) for the first and second radar chips 202 and 204 and control characteristics of the LO signal, such as frequency ramping range, speed etc. If other radar chips are present, the controller 206 can be configured to control those as well. The controller 206 is also configured to obtain and transfer radar information from the radar chips.

Figure 3:
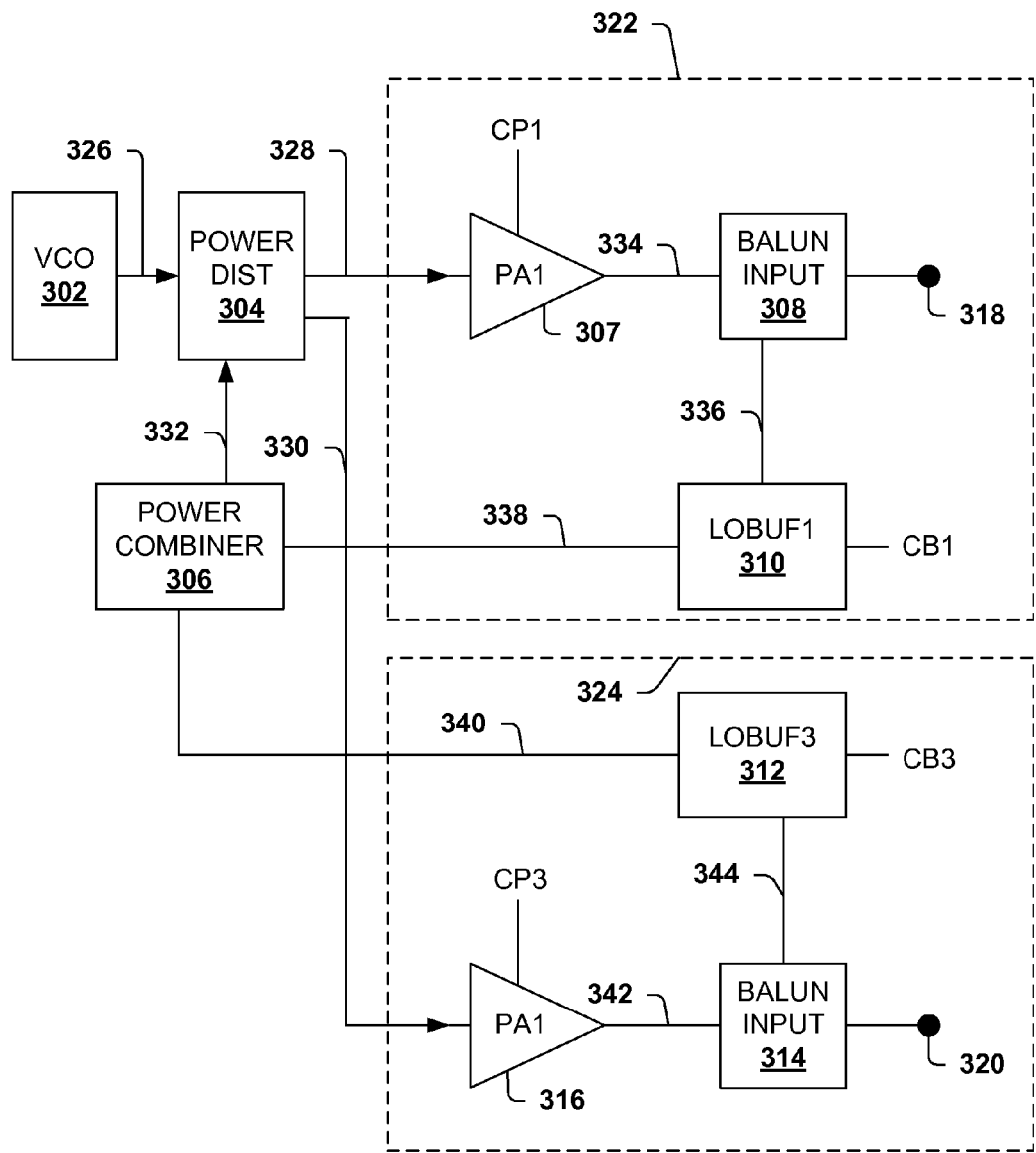
FIG. 3 is a diagram illustrating a radar chip.

FIG. 3 is a diagram illustrating a radar chip 300. The chip 300 can be used with the radar sensor 200 and/or the system 100. The chip 300 is simplified in that receiver channels and a transmission channel are omitted in order to facilitate understanding.

The radar chip 300 includes a voltage controlled oscillator (VCO) 302, a power distribution component 304, a power combiner 306, a first TX channel 322, and a third TX channel 324. The first channel 322 includes a first channel amplifier 307, a first channel input 308 and a first channel LO buffer 310. The third channel 324 includes a third channel amplifier 316, a third channel input 314 and a third channel LO buffer 312. A second TX channel is present and similarly configured, but is omitted to simplify the diagram.

The VCO 302 is configured to generate a local oscillator (LO) signal 326 having selected characteristics. The VCO 302 can be in an ON or active state, wherein the VCO 302 is enabled and generating the LO signal 326. Alternatively, the VCO 302 can be in an OFF or inactive state, wherein the VCO 302 is disabled and does not generate the LO signal 326. In a master mode, the VCO 302 is active or ON. In a slave mode, the VCO 302 is inactive or OFF.

The power distribution component 304 is connected to TX channels of the radar chip 300, including the first channel 322 and the third channel 324. The power distribution component 304 is configured to provide a power signal 328, 330 to the TX channels. The power signal 328, 330 can be based on the LO signal 326 from the VCO 302 or based on an external local oscillator (LO) signal 332. The power distribution component 304 is configured to receive the external LO signal 332 from the power combiner 306.

The power distribution component 304 is configured to operate in the master mode where the LO signal 326 from the VCO 302 is used or the slave mode where the external LO signal 332 from the power combiner 306 is used.

The power combiner 306 is configured to receive channel buffer signals from the TX channels and to generate the external LO signal 332 based on the received channel buffer signals, including a first buffer signal 338 from the first channel buffer 310 and a third buffer signal 340 from the third channel buffer 312. In one example, the external LO signal 332 is a forwarded version of one of the received channel buffer signals. In another example, the external LO signal 332 is combined from a plurality of the received channel buffer signals.

The first channel buffer 310 and the third channel buffer 312 are coupled to inputs 308 and 314 and configured to be enabled or disabled. When enabled, the buffers 310 and 312 receive input signals 336, 344 from inputs 308 and 314, respectively. Typically the input signals are from another radar chip or component external to the radar chip 300.

When disabled, the buffers 310 and 312 do not pass a signal. Additionally, the buffers 310 and 312 are configured to mitigate generation of leakage signals when disabled. Other buffers tend to generate substantial leakage signal, particularly when connected to inputs having relatively large voltage signals.

The first channel buffer 310 is connected to the first inputs 308. When enabled, the buffer 310 passes the signal 336 and/or voltage present at the first input 308 to the power combiner as the first buffer signal 338. When disabled, the buffer 310 does not provide the signal present at the first input 308, even if the voltage at the first input 308 is relatively large, such as greater than or equal to about 1 Vpp (Volts Peak to Peak), 4 Vpp, and the like.

Similarly, the third channel buffer 312 is connected to the third input 314. When enabled, the buffer 312 passes the signal 344 at the third input 314 to the power combiner 306 as the third buffer signal. When disabled, the buffer 312 does not provide the signal present at the third input 314, even if the voltage at the third input 314 is relatively large, such as greater than or equal to about 1 Vpp (Volts Peak to Peak), 4 Vpp, and the like.

The first channel input 308 is coupled to the first power amplifier 307 and the first terminal 318. The first power amplifier 307 is configured to generate a first channel signal 334 when enabled and does not generate a signal when disabled. The first power amplifier 307 is enabled or disabled by a control signal CP1. The first channel signal 334 is based on the power signal 328.

The first input 308 is configured to convert the first channel signal from a differential signal to a single ended signal. The converted first channel signal is then provided to the first terminal 318. Otherwise, the first input 308 is configured to receive a first external signal from the first terminal 318. This can be an external oscillator signal or the like.

The third channel input 314 is coupled to the third power amplifier 316 and the third terminal 320. The third power amplifier 314 is configured to generate a third channel signal 342 only when enabled. The third channel signal 342 is generated based on the power signal 330. The third power amplifier 314 is enabled or disabled by a control signal CP3.

The third input 320 is configured to convert the third channel signal 342 from a differential signal to a single ended signal. The converted third channel signal is then provided to the third terminal 320. Otherwise, the third input 314 is configured to receive a third external signal from the third terminal 320. The third external signal can be provided to the third buffer 312 without converting to/from a differential signal.

Figure 4:
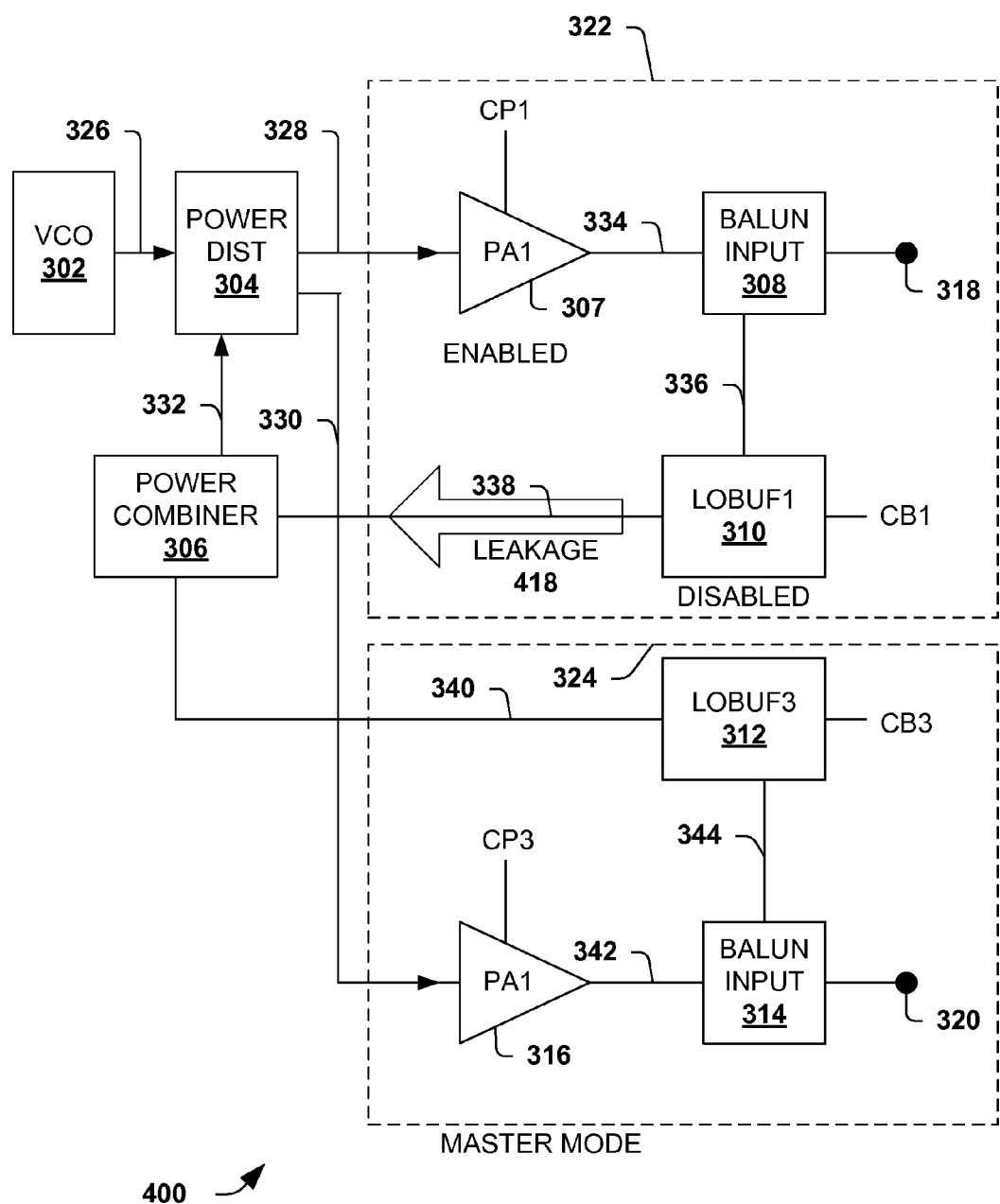
FIG. 4 is a diagram illustrating a radar chip operating in master mode.

FIG. 4 is a diagram illustrating a radar chip 400 operating in master mode. The chip 400 is an example of the radar chip 300 described above, but operating in the master mode and the first channel is enabled and transmitting signal, but the third channel is disabled and no transmitting. It is appreciated that the radar chip 400 can be used with the radar sensor 200 and/or the system 100. The chip 400 is simplified in that receiver channels and a transmission channel are omitted in order to facilitate understanding. For additional description of like numbered components, refer to the description of FIG. 3.

The radar chip 400 includes a voltage controlled oscillator (VCO) 302, a power distribution component 304, a power combiner 306, a first TX channel 322, and a third TX channel 324. The first channel 322 includes a first channel amplifier 307, a first channel input 308 and a first channel buffer 310. The third channel 324 includes a third channel amplifier 316, a third channel input 314 and a third channel buffer 312. A second TX channel is present and similarly configured, but is omitted to simplify the diagram.

The radar chip 400 is operating in master mode. As a result, the VCO 302 is enabled and generates the LO signal 326. The power distribution component 304 ignores any signal provided by the power combiner 306 and uses only the LO signal 326. The power distribution component 304 generates the power signals 328, 330 and provides them to the first and third power amplifiers 307 and 316 as shown.

The third channel 324 passes the power signal 330 out from its terminal 320 as an external LO signal. This signal is essentially the LO signal 326. The third amplifier 316 is not set for transmitting, thus the voltage seen at the third input 314 is relatively low and less than some mVpp (millivolts peak-peak), such as less than 10 mVpp.

The third channel buffer 312 is disabled and is configured to not generate a leakage signal.

The first channel 322 transmits a signal for radar purposes. The first power amplifier 307 is enabled by signal CP1 and generates a first channel signal 334 based on the power signal 328. The first channel signal 334 is provided to the input 308, which converts the signal 334 to a single-ended signal.

The first channel buffer 310 is disabled and sees a relatively large voltage from the first input 308. However, the first buffer 310 is configured to mitigate generation of leakage signal. As a result, leakage signal 418 is not present. It is appreciated that using other types of buffers would result in the leakage signal 418 being present.

Figure 5:
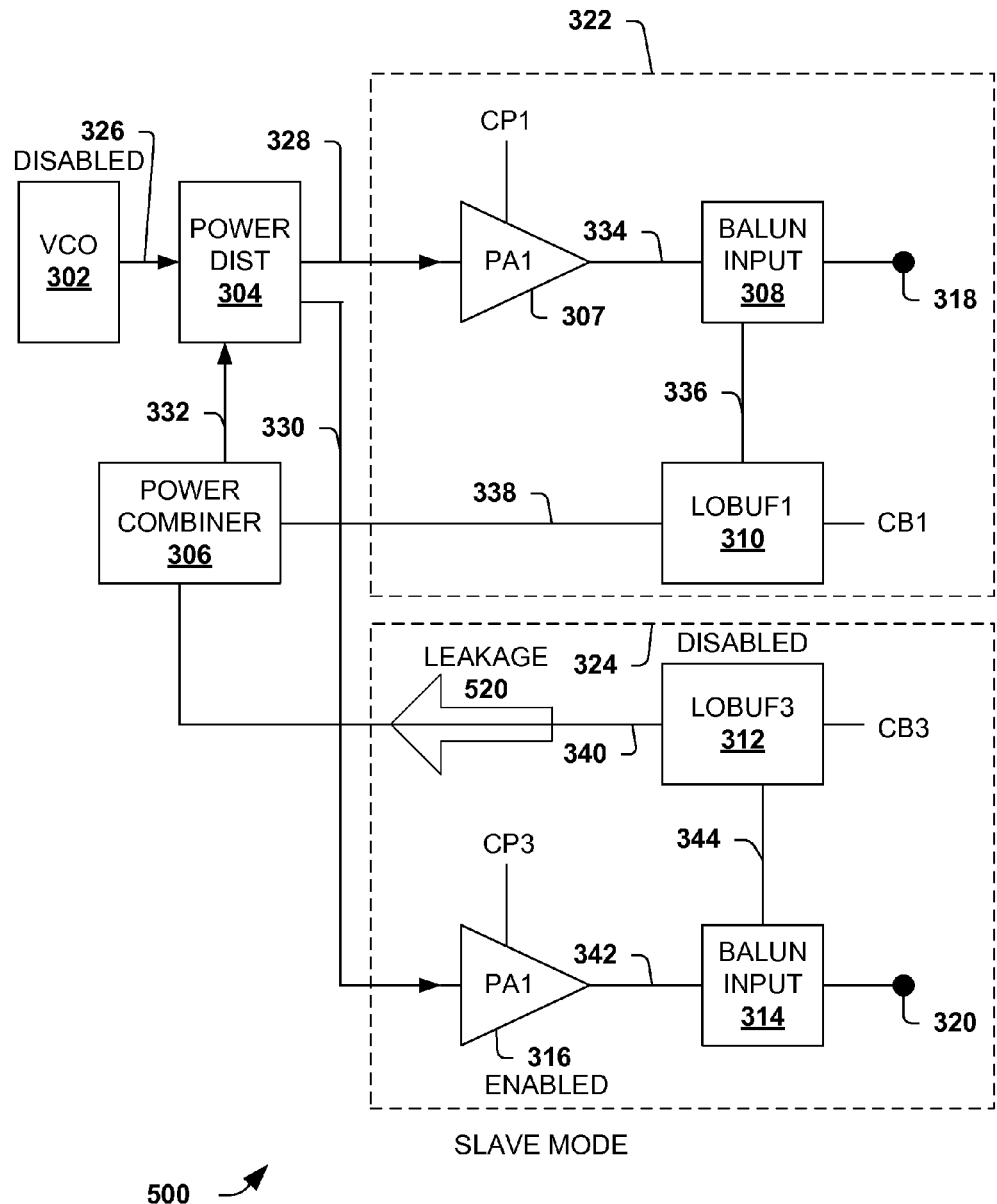
FIG. 5 is a diagram illustrating a radar chip operating in a slave mode.

FIG. 5 is a diagram illustrating a radar chip 500 operating in a slave mode. The chip 500 is an example of the radar chip 300 described above, but operating in the slave mode. In this mode, the radar chip 500 uses an external local oscillator signal instead of generating its own. The first TX channel 322 is disabled for transmitting and the terminal 318 is used for LO input. The third TX channel 324 is enabled for transmitting. As a result, the chip 500 can be cascaded with other chips and provide improved performance, resolution and stability.

It is appreciated that the radar chip 500 can be used with the radar sensor 200 and/or the system 100. The chip 500 is simplified in that receiver channels and a transmission channel are omitted in order to facilitate understanding. For additional description of like numbered components, refer to the description of FIG. 3.

The radar chip 500 includes a voltage controlled oscillator (VCO) 302, a power distribution component 304, a power combiner 306, a first TX channel 322, and a third TX channel 324. The first channel 322 includes a first channel amplifier 307, a first channel input 308 and a first channel buffer 310. The third channel 324 includes a third channel amplifier 316, a third channel input 314 and a third channel buffer 312. A second TX channel is present and similarly configured, but is omitted to simplify the diagram.

The radar chip 500 is operating in the slave mode. As a result, the VCO 302 is disabled. The power distribution component 304 uses only the external LO signal 332 from the power combiner. The power distribution component 304 generates the power signals 328, 330 and provides them to the first and third power amplifiers 307 and 316 as shown.

The third channel 324 is enabled for transmission and uses the power signal 330 to generate a third channel signal 342 for transmission. The third amplifier 316 is enabled according to control signal CP3 and generates the third channel signal 342, which has a relatively high voltage. The third channel signal 342 is converted to a single-ended signal at the balun input 314. Additionally, it is noted that the high voltage is at the input and, as a result, the third buffer 312.

The first channel 322 is configured to receive an external LO signal at its terminal 318. The external LO signal passes through the input 308 and is buffered the first buffer 310. From here, the signal is provided to the power combiner 306, which provides the signal to the power distribution component 304. The power distribution component 304 uses the external LO signal to generate power signals 328, 330.

Figure 6:
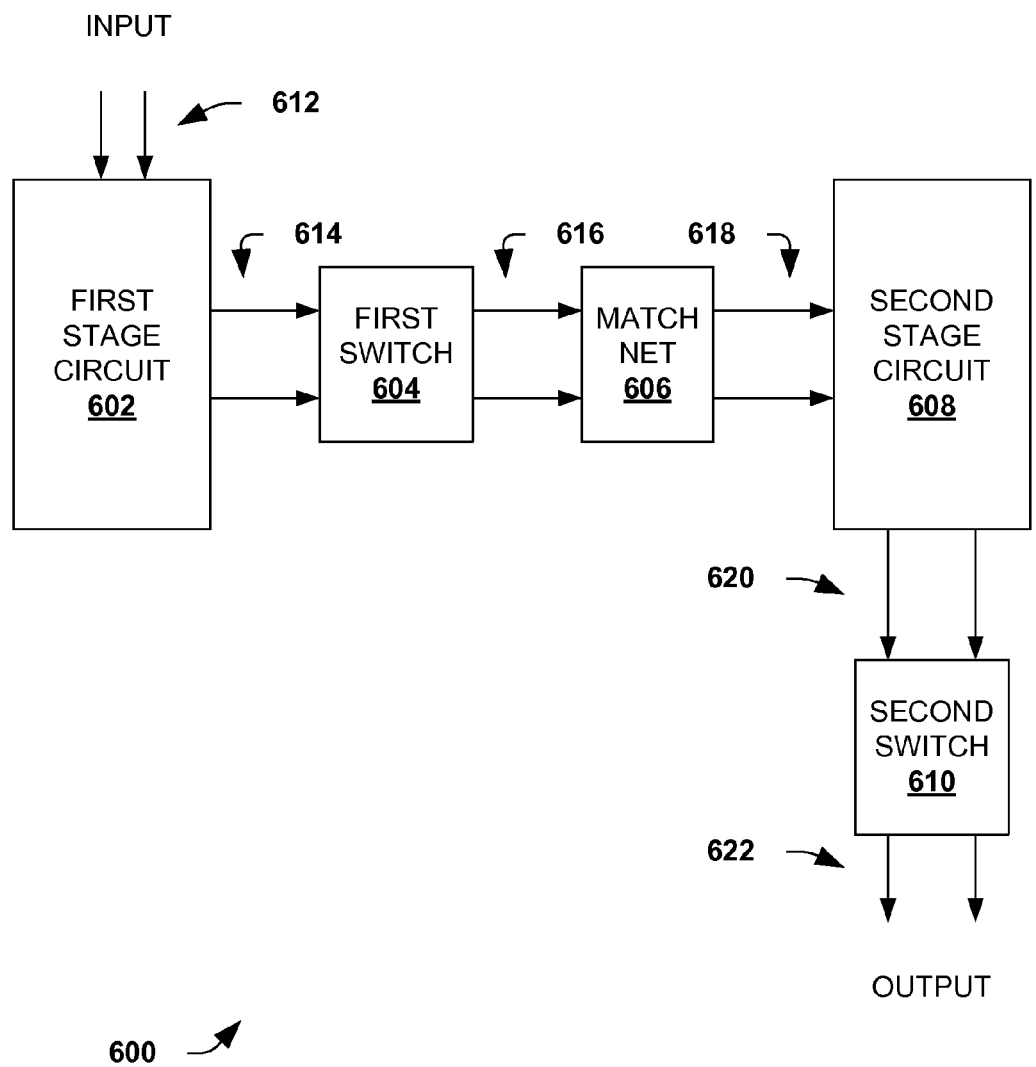
FIG. 6 is a diagram illustrating a low leakage buffer.

FIG. 6 is a diagram illustrating a low leakage signal buffer 600. The buffer 600 can be used in the above radar chips (e.g., LOBUF1 310 and LOBUF3 314) and variations thereof. The buffer 600 is configured to mitigate leakage signal when disabled, even in the presence of relatively high voltages at its input. The high voltages include, for example, voltages exceeding 4 Vpp (Volts Peak to Peak).

The buffer 600 includes a first stage circuit 602, a first switch 604, a matching network 606, a second stage circuit 608, and a second switch 610. The buffer 600 is a cascode circuit using the first stage circuit 602 and the second stage circuit 608. The buffer 600 operates with differential signals. The first stage circuit 602 receives an input 612 and generates a first stage output 614 based on the input 612. The first stage input 612 can be coupled to a balun input, such as the input 308 or 314. The second stage circuit 608 receives a matched first stage output 618 and generates a second stage output 620 based on the first stage output 618.

The first switch 604 receives the first stage output 614 and is configured to pass the output 614 as its switch output 616, when switch is disabled (buffer is enabled), or to short both lines when the switch 604 is enabled (buffer is disabled).

The matching network 606 is configured to have a matching impedance to a load in order to facilitate power transfer and also facilitate the mitigating generation of a leakage signal at the buffer 600 while in the disabled mode. The matching network 606 receives the first switch output 616 and generates the matched first stage output 618 therefrom at buffer enabled mode. At the buffer disabled mode the leakage mitigation will be effective by combination of the first switch 604 and the matching network 606 because the input differential impedance of the second stage circuit 608 is low (<10Ω) and the impedance of the switch 604 at shorted mode (or switch enabled mode) is also not 0Ω (≈3-5Ω). Without this matching network (it transfers the low input impedance to higher impedance) the leakage signal minimization will likely not be good enough.

The second switch 610 receives the second stage output 620 and generates a buffer output 622. The second switch 610 is configured to pass the second stage output 620 as the buffer output 622 when buffer enabled. However, upon the second switch 610 being enabled, the differential lines are shorted together and no substantial leakage signal is generate at the output 622.

The combination of the first switch 604, the matching network 606 and the second switch 610 mitigate the generation of a leakage signal at the buffer output 622 when the buffer is disabled. The leakage signal is mitigated even for relatively high voltages being present at the input 612.

FIGS. 7A-7I are examples of suitable switches, also referred to as RF switches. These switches can be used in low leakage buffers, such as the buffer 600, described above to mitigate the generation of a leakage signal when the buffer is disabled. It is appreciated that these are examples and that variations and other implementations are possible.

Figure 7A:
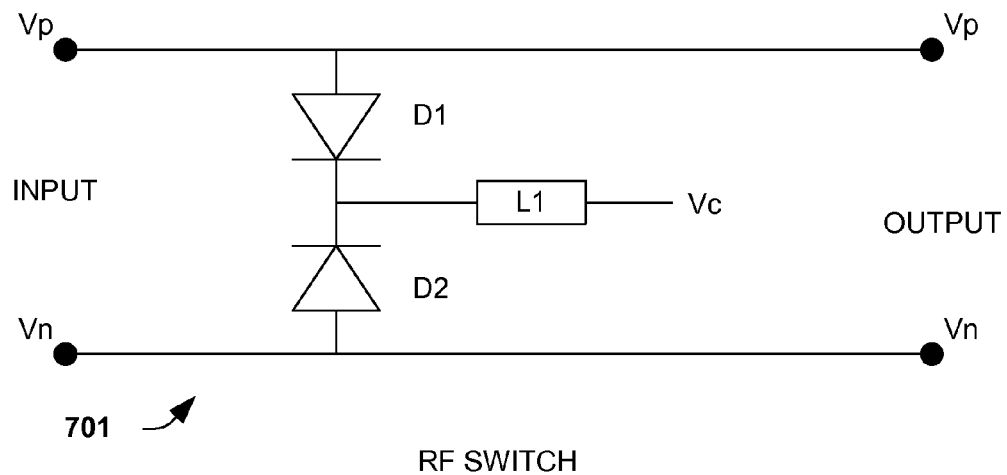
FIGS. 7A-7I are diagrams illustrating examples of suitable RF switches.

FIG. 7A is a diagram illustrating a first RF switch 701 using a pair of series connected diodes. The switch 701 is an example of a suitable switch that can be used and a first or second switch in the buffer 600, described above, and variations thereof.

The switch 701 is configured for differential signals and includes an input on a left side at terminals Vp and Vn and provides an output at output terminals Vp and Vn. An upper line, referred to as a p or + line and a lower line, referred to as a n or − line are shown between the input and output.

Generally, the switch 701 operates such that when a buffer is disabled, a switch control signal Vc is set LOW and a short is created between the p line and the n line such that no differential signal is present at the output.

The switch 701 includes a first diode D1 and a second diode D2 connected in series with opposite polarities. A midpoint between the diodes D1 and D2 is connected to a resistive load L1. The switch control signal Vc is connected to the resistive load.

When Vc is high, the diodes do not conduct and create an open circuit condition between the n and p lines. When Vc is low, any signals or voltages present on the n and p lines results in a short condition.

Figure 7B:
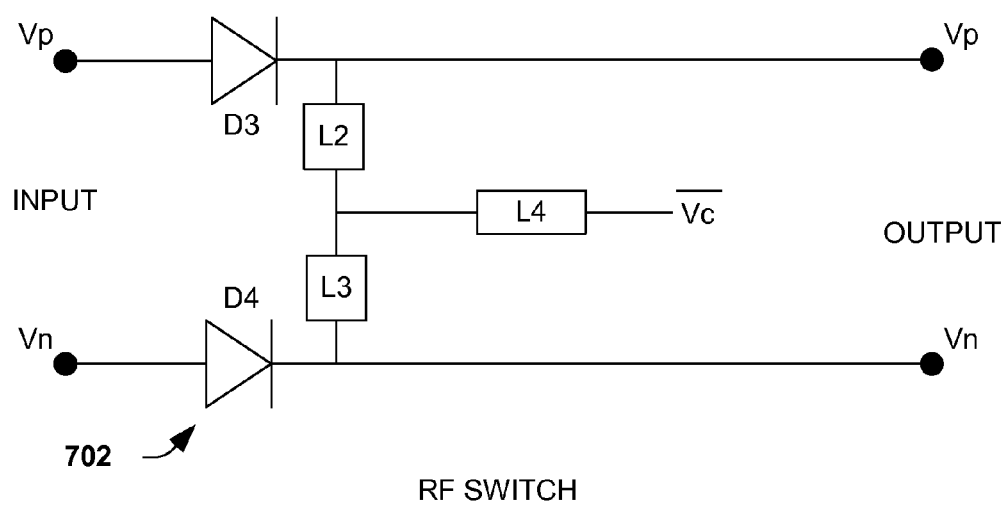

FIG. 7B is a diagram illustrating another RF switch 702 where diodes are connected in parallel. The switch 702 is an example of a suitable switch that can be used and a first or second switch in the buffer 600, described above, and variations thereof.

The switch 702 is configured for differential signals and includes an input on a left side at terminals Vp and Vn and provides an output at output terminals Vp and Vn. An upper line, referred to as a p or + line and a lower line, referred to as a n or − line are shown between the input and output.

A third diode D3 is connected to the Vp input and a fourth diode D4 is connected to the Vn input. Resistive loads L2 and L3 are connected in series to the cathodes of D3 and D4. A midpoint between the loads L2 and L3 is connected to another resistive load L4, which receives a complement of the switch control signal Vc.

When the buffer is disabled, the complement of the control signal is high, which blocks currents or signals from the input and creates a virtual short by the series of resistive loads L2 and L3.

This switch 702 can be used for single ended (non differential) or differential modes. However, the series resistance of Diode 3 and 4 and the parasitic capacitance at cathode nodes can lead to higher loss than the switch 701 since the parasitic capacitance of Diode 1 and 2 in switch 701 can be compensated by design.

Figure 7C:
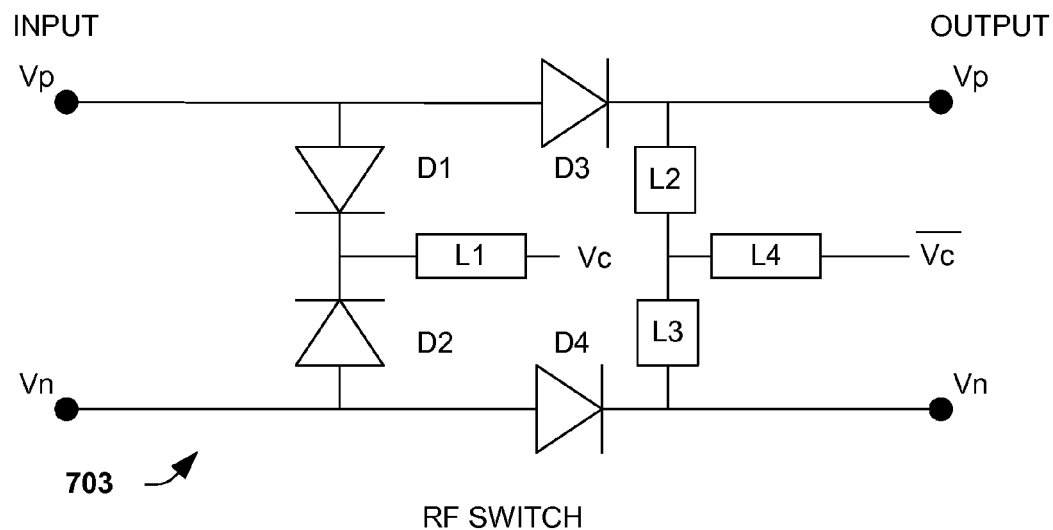

FIG. 7C is a diagram illustrating another RF switch 703 using diodes connected in parallel and in series modes. The switch 703 is an example of a suitable switch that can be used and a first or second switch in the buffer 600, described above, and variations thereof. The switch 703 uses arrangements used in switch 701 and 702.

The switch includes the series connected diodes D1 and D2 and the parallel connected Diodes D3 and D4 as described above. This arrangement provides higher isolation and is applicable for differential mode.

Figure 7D:
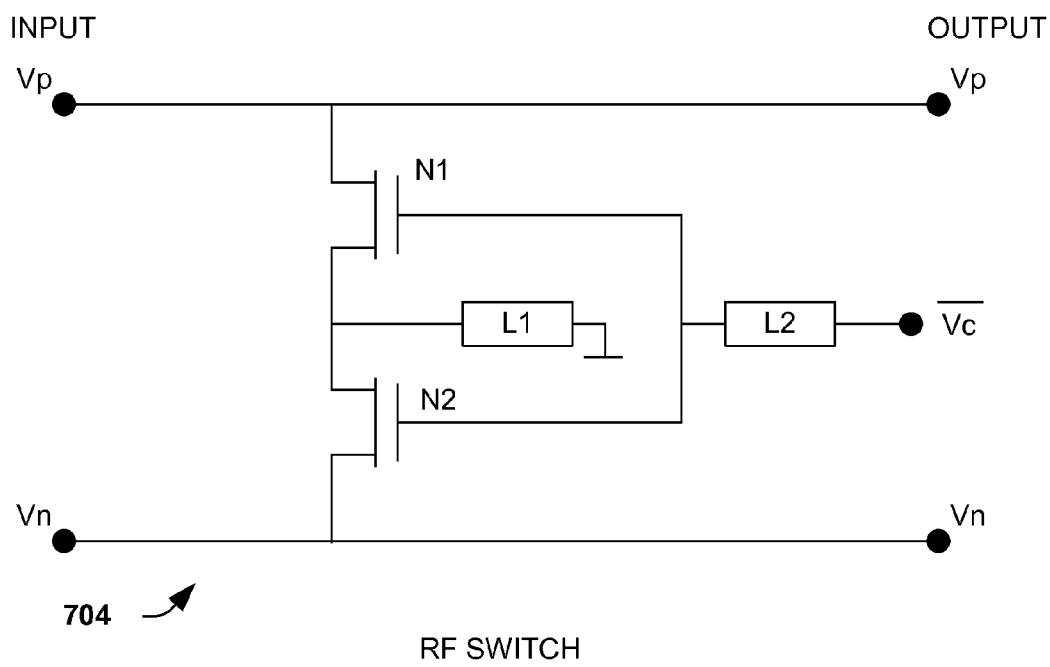

FIG. 7D is a diagram illustrating another RF switch 704 using NMOS transistors and resistive loads. The switch 704 is an example of a suitable switch that can be used and a first or second switch in the buffer 600, described above, and variations thereof.

The switch 704 includes series connected transistors N1 and N2. A source of N1 and a drain of N2 are connected to ground through resistive load L1. Gates of N1 and N2 are connected to the complement of Vc through resistive load L2.

In operation, when the buffer is disabled, Vc is LOW and the complement of Vc is HIGH. As a result, the transistors N1 and N2 are on and create a short between the p line and the n line. When the buffer is enabled, the transistors N1 and N2 are OFF and there is no short between the n and p lines. This arrangement is provides a low loss, however the switch 704 is only operable in differential mode.

Figure 7E:
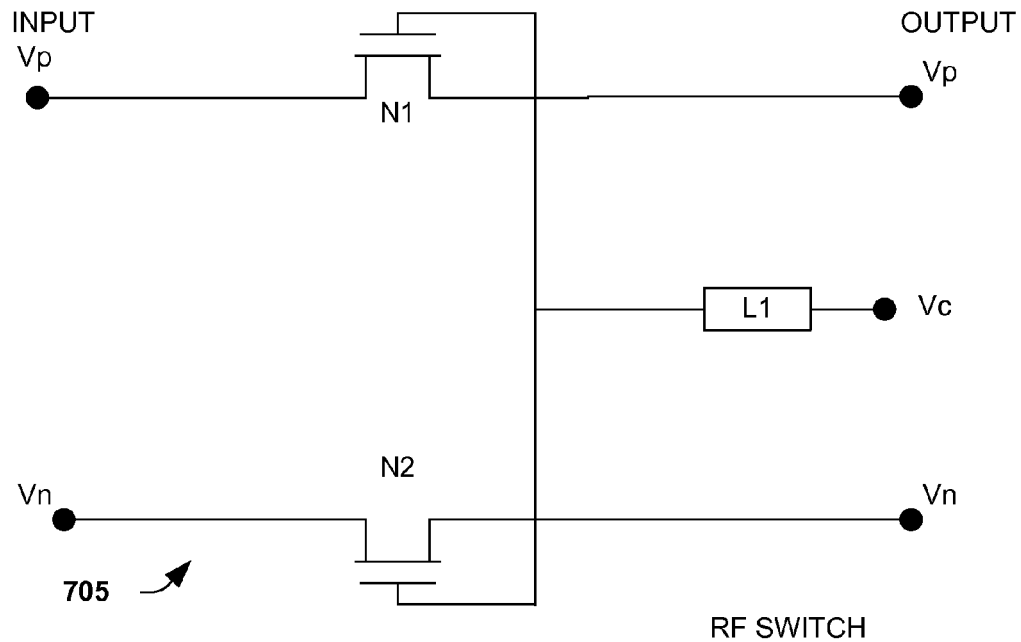

FIG. 7E is a diagram illustrating another RF switch 705 using NMOS transistors. The switch 705 is an example of a suitable switch that can be used and a first or second switch in the buffer 600, described above, and variations thereof.

Transistors N1 and N2 are connected in parallel along the p line and the n line, respectively. Gates of N1 and N2 are connected to the switch control Vc through resistive load L1.

In operation, when the buffer is enabled Vc is high and transistors N1 and N2 are ON. When the buffer is disabled, Vc is LOW and transistors N1 and N2 are OFF and signals present at the input are blocked from the output.

The arrangement of the switch 705 is applicable to single ended mode and differential mode. However, this arrangement has a higher loss.

Figure 7F:
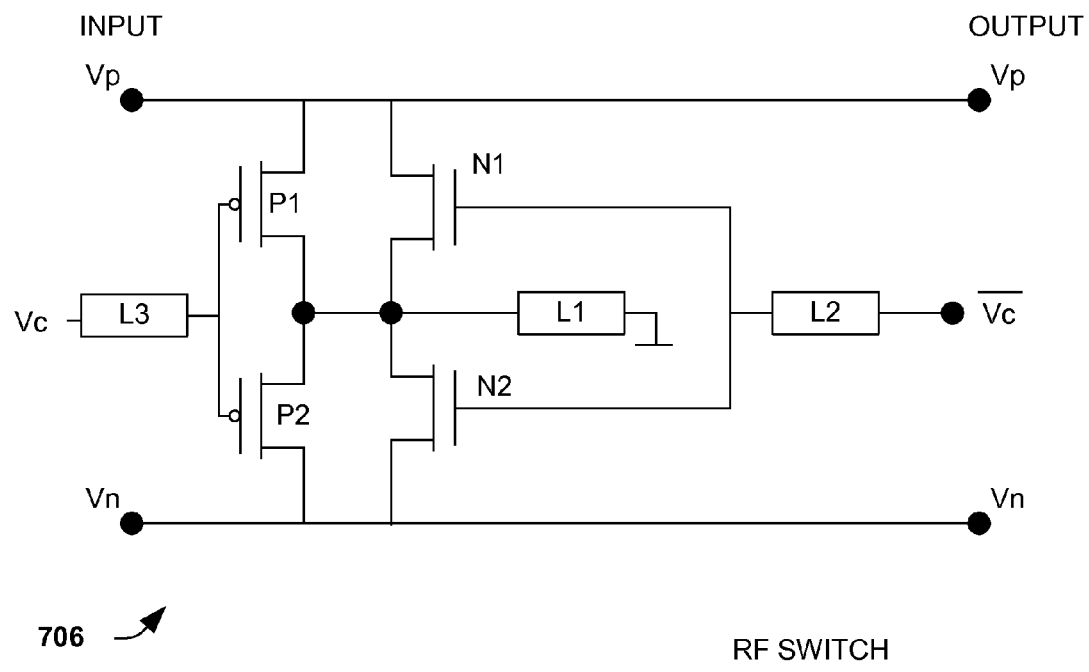

FIG. 7F is another diagram illustrating an RF switch 706 using NMOS transistors, PMOS transistors and resistive loads. The switch 706 is an example of a suitable switch that can be used and a first or second switch in the buffer 600, described above, and variations thereof.

A series of NMOS transistors N1 and N2 connect the p line to the n line. Similarly, a series of PMOS transistors P1 and P2 connect the p line to the n line. Gates of N1 and N2 are connected to the complement of the switch control signal Vc through resistive load L2. Gates of P1 and P2 are connected to Vc through resistive load L3. A source of N1, a drain of N2, a drain of P1 and a source of P2 are connected to ground through resistive load L1.

In operation, when the buffer is enabled, the transistors N1, N2, P1 and P2 are turned OFF. When the buffer is disabled, the transistors N1, N2, P1 and P2 are turned ON and a virtual short between the p line, n line and ground is created.

The arrangement of the switch 706 provides a higher isolation and lower loss. However, the arrangement applies only to differential mode.

Figure 7G:
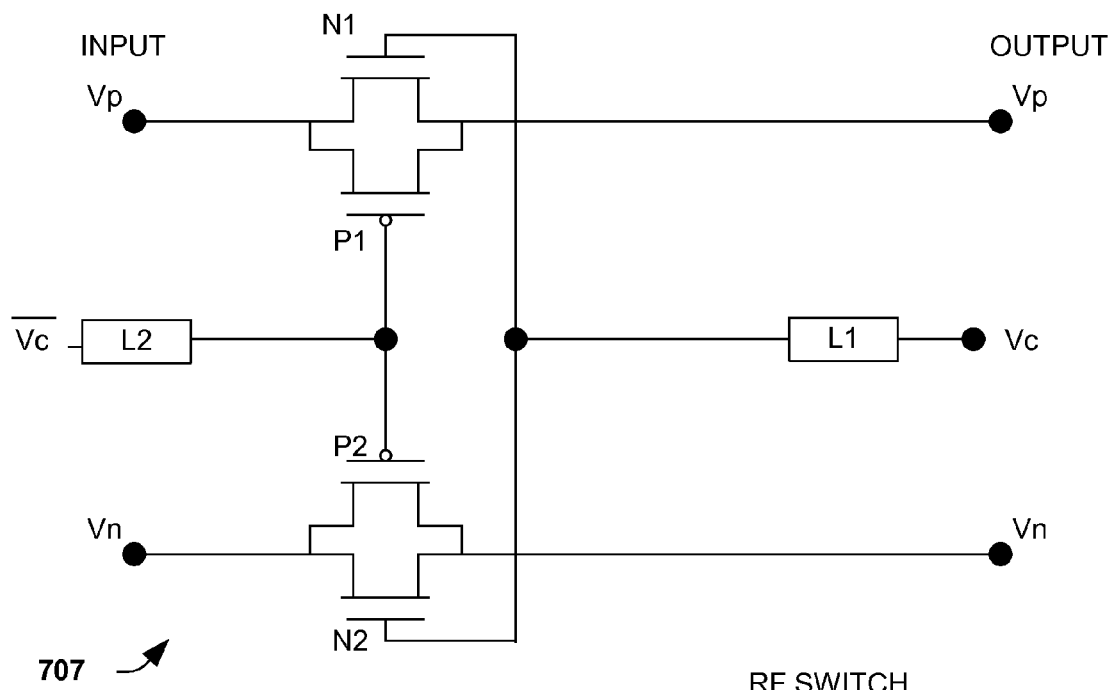

FIG. 7G is diagram illustrating an RF switch 707 using NMOS transistors, PMOS transistors and resistive loads. The switch 707 is an example of a suitable switch that can be used and a first or second switch in the buffer 600, described above, and variations thereof.

The p line includes transistor N1 and transistor P2 connected in parallel. The n line includes transistors P2 and N2 connected in parallel. Gates of the PMOS transistors P1 and P2 are connected to the complement of the switch control signal Vc through a resistive load L2. Gates of the NMOS transistors N1 and N2 are connected to the switch control signal Vc through a resistive load L1.

In operation, the transistors N1, N2, P1 and P2 are turned OFF when the buffer is disabled and the Vc signal is set to LOW. As a result, signals at the input are blocked/isolated from the output. The transistors N1, N2, P1 and P2 are turned ON when the buffer is enabled and the Vc is set to HIGH.

The arrangement of the switch 707 provides a lower loss in an ON state and can be used with single ended or differential mode. However, parasitic loss can occur while the switch 707 is OFF.

Figure 7H:
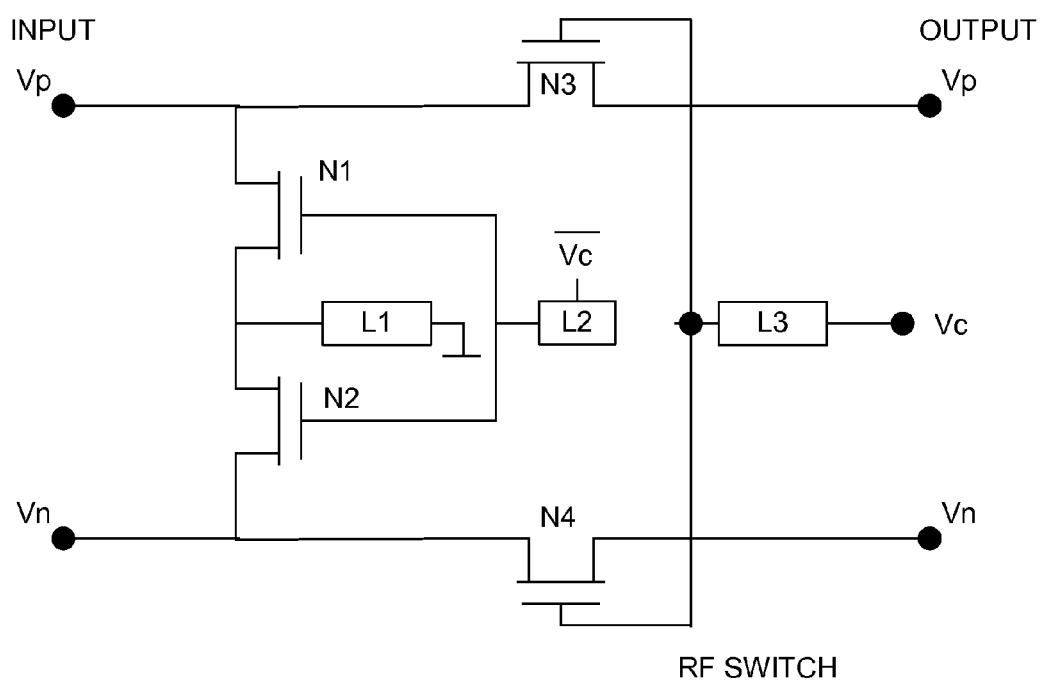

FIG. 7H is diagram illustrating an RF switch 708 using NMOS transistors and resistive loads. The switch 708 is an example of a suitable switch that can be used and a first or second switch in the buffer 600, described above, and variations thereof.

The switch 708 has an arrangement that includes a combination of the components used in switches 704 and 705. Series connected transistors N1 and N2 create a short upon the switch control signal Vc being LOW and transistors N3 and N4 provide isolation on the switch control signal Vc being LOW. The arrangement of the switch 708 provides high isolation, but has a higher loss than other switch arrangements.

Figure 7I:
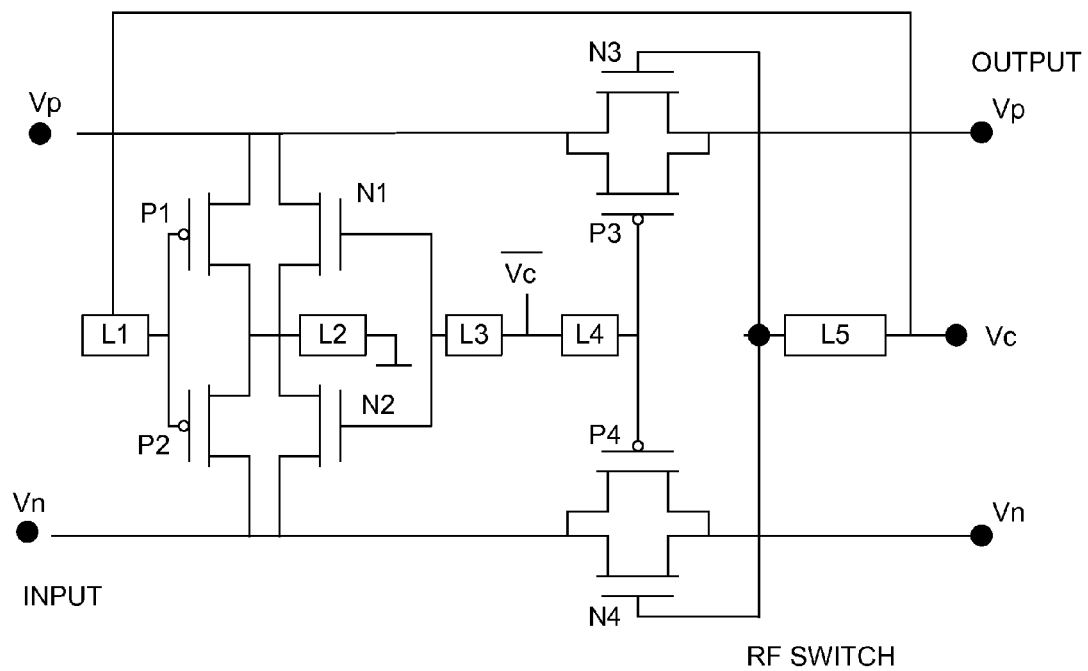

FIG. 7I is diagram illustrating an RF switch 709 using NMOS transistors, PMOS transistors and resistive loads. The switch 709 is an example of a suitable switch that can be used and a first or second switch in the buffer 600, described above, and variations thereof.

Transistors N1, N2, P1 and P2 create a short across the p line and the n line upon the switch being OFF and the switch control Vc being LOW. Transistors N3, N4, P3 and P4 provide isolation upon the switch being OFF and the switch control Vc being LOW.

The arrangement of switch 709 provides higher isolation, but also has higher loss than other switch arrangements.

It is appreciated that the FIGS. 7A to 7I provide examples of suitable switch arrangements that can be used to mitigate leakage signal. However, it is appreciated that other switch arrangements are contemplated.

Figure 8:
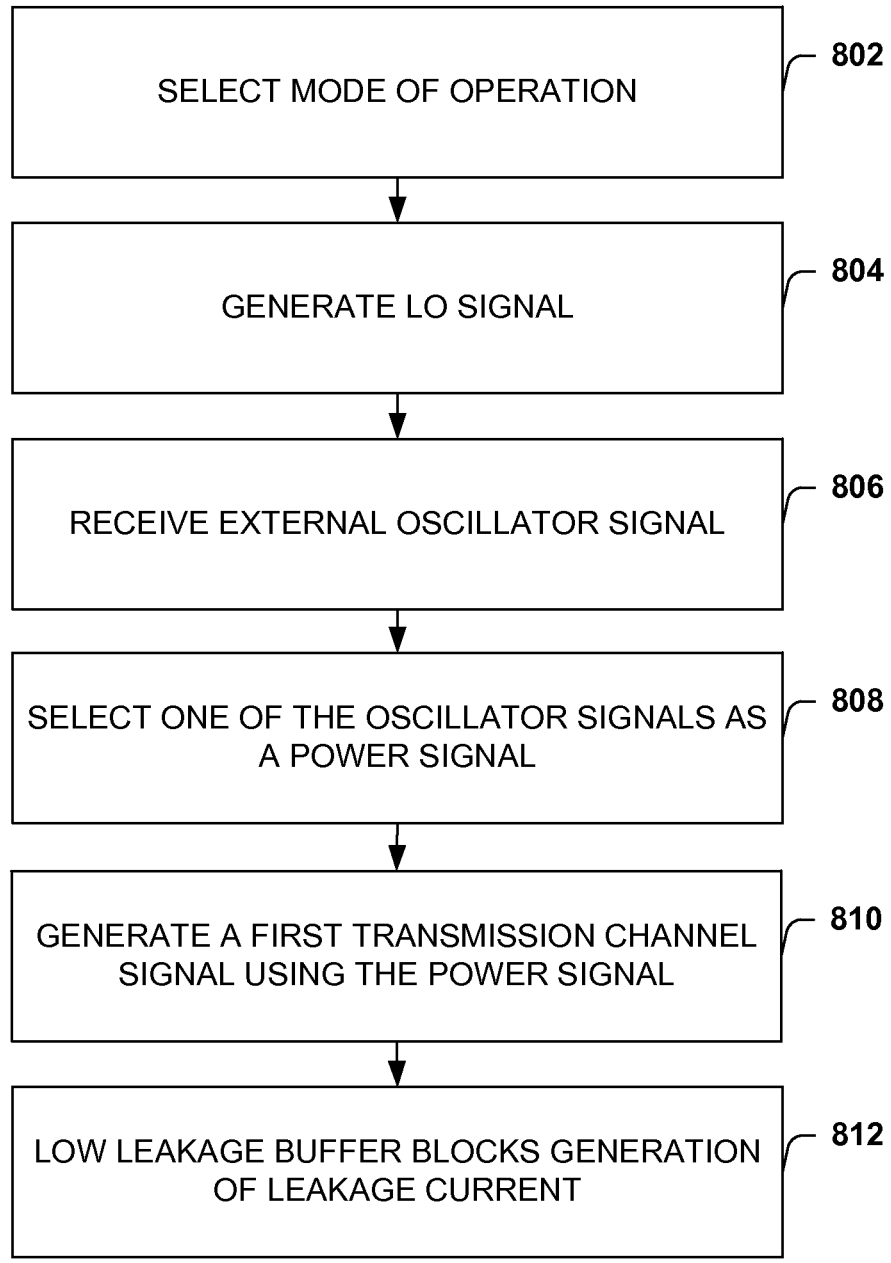
FIG. 8 is a flow diagram illustrating a method of operating a radar chip.

FIG. 8 is a flow diagram illustrating a method 800 of operating a radar chip. The method identifies and uses an oscillator signal for generating transmission signals via one or more transmission channels.

The method 800 can be used to cascade a plurality of radar chips together and operate as a radar sensor system or arrangement. The plurality of radar chips can use a large number of transmission and receiving channels in order to facilitate performance, including resolution. The method 800 can be performed with arrangements, systems and variations thereof described above.

The method 800 begins at block 802 where a mode of operation is selected for a radar chip by a controller or a control unit. The mode of operation is a slave mode or a master mode. For the slave mode, the radar chip uses an oscillator signal from a master chip. For the master mode, the radar chip uses its own locally generated oscillator signal.

An oscillator signal generation device of the radar chip generates a local oscillator (LO) signal at block 804 if the selected mode is the master mode. The device can be a voltage controlled oscillator (VCO). The LO signal is generated with selected characteristics, such as frequency ramping range and ramping speed.

An external oscillator signal is received by a transmission channel of the radar chip upon the selected mode being the slave mode at block 806. The external oscillator signal also has selected characteristics, such as frequency.

One of the LO signal and the external oscillator signal is selected as a power signal for transmission by a power distribution component of the radar chip at block 808 according to the selected mode. If the mode is the slave mode, the external oscillator signal is selected. If the mode is the master mode, the LO signal is selected.

A transmission channel of the radar chip generates a first transmission channel signal using the power signal at block 810. Typically, a power amplifier is used to generate the first channel signal and a balun input converts the differential signal to a single ended signal. The first channel signal can be used as a radar transmission signal.

A low leakage buffer of the transmission channel blocks or prevents generation of a leakage signal at block 812. The buffer includes one or more switches and a matching network configured to facilitate blocking the leakage signal, particularly in the presence of a high voltage at an input of the buffer.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication according to examples described herein.

In one example, a cascaded radar sensor arrangement is disclosed. The arrangement includes a first radar chip and a second radar chip. The first radar chip operates in a master mode and is configured to generate an oscillator signal and provide the oscillator signal using a first transmission channel. The second radar chip operates in a slave mode and is configured to receive and utilize the oscillator signal from the first chip using a first channel of the second radar chip.

In another example, a radar chip arrangement is disclosed. The arrangement is configured to operate in a master mode and a slave mode. The arrangement includes an oscillator signal generating device, a power combiner, a power distribution component, and a plurality of transmission channels. The oscillator signal device is configured to generate a local oscillator signal in a first mode. A power combiner is configured to provide an external oscillator signal in a second mode. A power distribution component configured to generate a power signal based on the local oscillator signal and the external oscillator signal according to one of the first mode and the second mode. The plurality of transmission channels are configured to use the power signal from the power distribution component to generate a plurality of transmission channel signals.

In another example, a method of operating a radar chip is disclosed. One of a master mode and a slave mode is selected. A local oscillator signal is selected as a power signal upon the master mode being selected. An external oscillator signal is selected as the power signal upon the slave mode being selected. A first transmission channel generates a first channel signal using the power signal. A low leakage buffer blocks a leakage signal from the first transmission channel.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The component or structure includes a processor executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A cascaded radar sensor arrangement comprising:
a first buffer within a first radar chip and having a disabled mode, wherein the first buffer includes a switch configured to mitigate a first leakage signal in the disabled mode;
a second buffer within a second radar chip and having a disabled mode, wherein the second radar chip is cascaded with the first radar chip; and
a control unit coupled to the first radar chip and the second radar chip and configured to set the disabled mode for the first buffer.

2. The arrangement of claim 1, wherein the first buffer is configured to block an applied signal from passing as a buffered signal to a power combiner while in the disabled mode.

3. The arrangement of claim 2, wherein the applied signal is greater than about 1 Volt.

4. The arrangement of claim 1, wherein the first buffer is part of a first channel configured to generate a first channel signal.

5. The arrangement of claim 1, wherein the first radar chip includes a transmission channel configured to provide a local oscillator signal.

6. The arrangement of claim 1, wherein the second buffer is within a transmission channel, wherein the transmission channel receives an external oscillator signal from the first radar chip.

7. The arrangement of claim 1, wherein the second buffer is within a transmission channel and the transmission channel is configured to generate a channel signal.

8. The arrangement of claim 1, wherein the first buffer additionally includes a first stage connected to a buffer input of the first buffer and the switch, a matching network connected to the switch, a second stage connected to the switch and a second switch connected to the an output of the second stage.

9. The arrangement of claim 8, wherein the matching network and the second switch are configured to mitigate the first leakage signal in the disabled mode.

10. The arrangement of claim 8, wherein the matching network counters a low impedance of the second stage.

11. The arrangement of claim 1, wherein the switch is configured to short differential lines upon the first buffer being in the disabled mode.

12. The arrangement of claim 1, further comprising a power distribution circuit configured to provide a first power signal to the first radar chip and a second power signal to the second power chip based on a buffered signal from the first buffer.

13. The arrangement of claim 12, wherein the buffered signal is a local oscillator (LO) signal.

14. The arrangement of claim 1, further comprising a power distribution circuit generates a power signal based on a local oscillator signal and provides the power signal to the first radar chip and the second radar chip.

15. The arrangement of claim 1, wherein the first radar chip is configured to generate a radar signal based on the power signal and the second radar chip passes the power signal as an external signal.

16. The arrangement of claim 1, further comprising a power distribution circuit and a power combiner, wherein the power combiner is configured to combine a first buffered signal from the first buffer and a second buffered signal from the second buffer into a combined buffered signal and the power distribution circuit is configured to provide a first power signal to the first radar chip and a second power signal to the second power chip based on the combined buffered signal.

* * * * *